(12) United States Patent
Jiang et al.

(10) Patent No.: US 11,471,803 B2
(45) Date of Patent: Oct. 18, 2022

(54) FUEL WATER SEPARATOR FILTER WITH AN IMPROVED SEALING ARRANGEMENT

(71) Applicant: Cummins Filtration IP, Inc, Columbus, IN (US)

(72) Inventors: Zemin Jiang, Cookeville, TN (US); Amit Shashikant Wankhede, Pune (IN); Sonali Dattatraya Bisurkar, Sangli (IN); Jayant Singh, Pune (IN); Melvin Rice, Franklin, TN (US); Manikandan Annamalai, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 116 days.

(21) Appl. No.: 17/004,875

(22) Filed: Aug. 27, 2020

(65) Prior Publication Data
US 2020/0391146 A1 Dec. 17, 2020

Related U.S. Application Data

(62) Division of application No. 15/057,526, filed on Mar. 1, 2016, now Pat. No. 10,774,798.
(Continued)

(51) Int. Cl.
*B01D 36/00* (2006.01)
*F02M 37/24* (2019.01)
(Continued)

(52) U.S. Cl.
CPC ......... *B01D 36/001* (2013.01); *B01D 36/003* (2013.01); *F02M 37/24* (2019.01);
(Continued)

(58) Field of Classification Search
None
See application file for complete search history.

(56) References Cited

U.S. PATENT DOCUMENTS

| | | | |
|---|---|---|---|
| 4,139,463 A | 2/1979 | Murphy et al. | |
| 4,497,714 A | 2/1985 | Harris | |
| (Continued) | | | |

FOREIGN PATENT DOCUMENTS

| | | |
|---|---|---|
| CN | 2370935 | 3/2000 |
| CN | 1134676 A | 1/2004 |
| (Continued) | | |

OTHER PUBLICATIONS

Office Action issued for Chinese Patent Application No. 201610119129.3, dated Feb. 13, 2018, and English-language translation, 17 pages.
(Continued)

*Primary Examiner* — Hayden Brewster
(74) *Attorney, Agent, or Firm* — Foley & Lardner LLP

(57) ABSTRACT

A fuel water separator filter is configured as a filter-in-filter construction with multiple water separating layers to separate water from the fuel. The fuel water separator filter is configured for use on a suction side of a fuel pump, and includes a neck with a radially outward facing seal that in use seals with the filter housing. The filter housing is formed with an isolated water sump that in use is isolated from water that is stripped from the fuel by the first stage of the outer filter.

17 Claims, 16 Drawing Sheets

Related U.S. Application Data

(60) Provisional application No. 62/128,708, filed on Mar. 5, 2015.

(51) Int. Cl.
*F02M 37/34* (2019.01)
*F02M 37/54* (2019.01)

(52) U.S. Cl.
CPC ..... *F02M 37/34* (2019.01); *B01D 2201/0415* (2013.01); *B01D 2201/291* (2013.01); *B01D 2201/4084* (2013.01); *F02M 37/54* (2019.01)

(56) References Cited

U.S. PATENT DOCUMENTS

| | | | |
|---|---|---|---|
| 5,484,466 A | 1/1996 | Brown et al. | |
| 5,855,772 A | 1/1999 | Miller et al. | |
| 6,511,599 B2 | 1/2003 | Jaroszczyk et al. | |
| 6,554,139 B1 | 4/2003 | Maxwell et al. | |
| 7,857,974 B2 | 12/2010 | Jiang | |
| 7,935,255 B2 | 5/2011 | Jiang | |
| 8,119,002 B2 | 2/2012 | Schiavon et al. | |
| 8,920,648 B2 | 12/2014 | Thomas et al. | |
| 8,932,465 B2 | 1/2015 | Wells et al. | |
| 2004/0164017 A1 | 8/2004 | Knight | |
| 2009/0020465 A1* | 1/2009 | Jiang | B01D 29/21 210/119 |
| 2009/0065427 A1* | 3/2009 | Jiang | B01D 35/153 210/458 |
| 2010/0213115 A1* | 8/2010 | Thomas | B01D 29/21 210/235 |
| 2010/0294707 A1* | 11/2010 | Abdalla | B01D 29/111 210/227 |
| 2012/0318728 A1 | 12/2012 | Eberle et al. | |
| 2013/0087497 A1* | 4/2013 | Wells | B01D 29/21 210/435 |

FOREIGN PATENT DOCUMENTS

| | | |
|---|---|---|
| CN | 102781540 A | 11/2012 |
| EP | 1 653 075 | 10/2004 |
| JP | 5954763 | 3/1984 |
| JP | s59-156403 | 9/1984 |
| JP | s60-257809 | 12/1985 |

OTHER PUBLICATIONS

Office Action issued for Indian Patent Application No. IN 201644007358, dated Mar. 9, 2021, 5 pages.

\* cited by examiner

FUEL WATER SEPARATOR FILTER WITH AN IMPROVED SEALING ARRANGEMENT

CROSS-REFERENCE TO RELATED APPLICATIONS

The present application is a divisional of U.S. patent application Ser. No. 15/057,526, filed Mar. 1, 2016, now U.S. Pat. No. 10,774,798, which claims priority to U.S. Provisional Patent Application No. 62/128,708, filed on Mar. 5, 2015. The contents of these applications are incorporated herein by reference.

FIELD

Embodiments of this disclosure relate generally to a fuel water separator filter.

BACKGROUND

Fuel water separator filters that filter fuel, for example diesel fuel, and also separate water from the fuel before the fuel is passed to the engine are known. Various fuel water separator filter constructions are described in, for example, U.S. Pat. Nos. 7,857,974 and 7,935,255. Conventional fuel water separator filters are generally disposed on the high pressure, or downstream, side of a fuel pump. A number of such fuel water separator filters typically employ an outer diameter seal that seals with an interior surface of a filter housing. Additionally, in various conventional fuel water separator filter designs, an outer diameter of a bottom endplate of the fuel water separator filter typically seals with the interior of the filter housing to form a water sump.

SUMMARY

Embodiments provided herein relate generally to a fuel water separator filter system. More specifically, the embodiments relate to a fuel water separator filter that is configured as a filter-in-filter construction with multiple water separating layers to separate water from the fuel.

In one embodiment, the fuel water separator filter is configured for use on a suction, or low pressure, side of a fuel pump, as opposed to being disposed on the high pressure, or downstream, side of a fuel pump. In some alternative embodiments, the described fuel water separator filter may be disposed on the high pressure side of a fuel pump.

In another embodiment, a suction side fuel water separator filter includes an outer filter and an inner filter disposed within and spaced apart from the outer filter. The outer filter may include a pleated filter media layer and a coalescing layer on an inner surface of the pleated filter media layer. The inner filter may include at least one of a pleated filter or a hydrophobic screen filter for additional water separation, and may include a structure that attaches the inner filter to the outer filter.

In another embodiment, a fuel water separator filter is provided that includes an inner filter with at least three sealing regions. The sealing regions are configured to produce a seal between the inner filter and a filter housing, a standpipe structure, and an endplate of an outer filter. The inner filter may be attached to the outer filter through snap-lock attachments, and may include an anti-backoff portion configured to prevent the inner filter from disengaging the outer filter. The inner filter may include openings configured to allow water removed from the fuel to drain to a water sump of the filter housing.

In another embodiment, a fuel water separator filter is provided that includes an inner filter formed integrally as a single unitary structure with an endplate of an outer filter. The inner filter may include a sealing region configured to seal against a standpipe structure and a sealing region configured to seal against a filter housing. The inner filter may include openings configured to allow water removed from the fuel to drain to a water sump of the filter housing.

In another embodiment, a fuel water separator filter is provided that includes a multipart inner filter configured to snap-lock engage an outer filter. The inner filter may include a frame structure, a snap-lock structure and a top cover, each of which may be formed independently or together as a unitary structure. The snap-lock portion includes a sealing region configured to seal against a standpipe structure and snap-lock legs configured to engage a base portion. The snap-lock legs form openings configured to allow water removed from the fuel to drain to a water sump of a filter housing, and may also self-center the inner filter in the outer filter. The base portion may be formed as part of an endplate of the outer filter, or may be formed as a separate piece that snap-lock engages with the endplate of the outer filter. The base portion may include a sealing region configured to seal against the filter housing.

In another embodiment, a fuel water separator filter is provided that includes an outer filter, an inner filter at least partially disposed within and secured to the outer filter, a first endplate configured to seal a first end of the outer filter, and a second endplate configured to seal a second end of the outer filter. The outer filter and the inner filter combined provide a plurality of water separating layers. The inner filter includes a first sealing region configured to produce a seal between the inner filter and a standpipe structure of a filter housing, and openings configured to allow water separated from a fuel flow through the fuel water separator filter to flow to an isolated water sump of the filter housing.

The second endplate may be a part of the outer filter and the inner filter may include a snap-lock attachment configured to engage the outer filter. The inner filter may include an anti-backoff portion configured to engage the outer filter and prevent the inner filter from disengaging the outer filter. The inner filter may include a second sealing region configured to produce a seal between the inner filter and a portion of the filter housing other than the standpipe structure and a third sealing region configured to produce a seal between the inner filter and the second endplate. The second endplate may be a part of the inner filter. The inner filter may be formed integrally as a single unitary structure with the second endplate. The inner filter may include a second sealing region configured to seal against the filter housing. The inner filter may include a frame structure, a snap-lock structure configured to engage the outer filter, and a top cover. The snap-lock structure and the frame structure may be formed as separate components. The snap-lock structure and the frame structure may be integrally formed as single unitary structure. The frame structure and the top cover may be formed as separate components. The snap-lock structure may include the first sealing region. The snap-lock structure may include snap-lock legs configured to engage a base portion. The snap-lock legs may be configured to self-center the inner filter in the outer filter. The base portion may be integrally formed as a single unitary structure with the second endplate. The base portion may be formed as a separate piece that snap-lock engages with the second endplate. The base portion may include a second sealing region configured to produce a seal between the inner filter and a portion of the filter housing other than the standpipe structure.

In another embodiment, a fuel water separator system is provided that includes a filter housing and a fuel water separator filter disposed in the filter housing. The filter housing including a fuel inlet, a fuel outlet, a standpipe structure, and an isolated water sump. The fuel water separator filter including an outer filter, an inner filter at least partially disposed within and secured to the outer filter, a first endplate configured to seal a first end of the outer filter, and a second endplate configured to seal a second end of the outer filter. The outer filter and the inner filter combined providing a plurality of water separating layers. The inner filter includes a first sealing region configured to produce a seal between the inner filter and the standpipe structure, and openings configured to allow water separated from a fuel flow through the fuel water separator filter to flow to the isolated water sump.

The fuel water separator system may include a fuel pump in fluid communication with the fuel water separator filter. The fuel water separator system may be disposed on a low pressure side of the fuel pump or on a high pressure side of the fuel pump. The filter housing may include a wall configured to separate an interior space of the filter housing into the isolated water sump and a filter chamber configured to receive the fuel water separator filter. The inner filter may include a second sealing region configured to produce a seal between the inner filter and a portion of the filter housing other than the standpipe structure, and a third sealing region configured to produce a seal between the inner filter and the second endplate. The second endplate may be a part of the inner filter. The inner filter may include a frame structure, a snap-lock structure configured to engage the outer filter, and a top cover.

In another embodiment, a fuel water separator filter is provided that includes an outer filter and an inner filter at least partially disposed within and secured to the outer filter. The outer filter and the inner filter combined provide a plurality of water separating layers. The inner filter includes means for securing the inner filter to the outer filter and means for producing a seal between the inner filter and a standpipe structure of a filter housing. The fuel water separator filter may additionally include means for preventing the inner filter from disengaging the outer filter. The fuel water separator filter may additionally include means for allowing water separated from a fuel flow through the fuel water separator filter to an isolated water sump of the filter housing.

BRIEF DESCRIPTION OF THE DRAWINGS

References are made to the accompanying drawings that form a part of this disclosure, and which illustrate the embodiments in which the systems and methods described in this Specification can be practiced. Like reference numbers represent like parts throughout the drawings.

DETAILED DESCRIPTION OF VARIOUS EMBODIMENTS

Embodiments provided herein relate generally to a fuel water separator filter system. More specifically, the embodiments relate to a fuel water separator filter that is configured as a filter-in-filter construction with multiple water separating layers to separate water from the fuel.

In one embodiment, the fuel water separator filter is configured for use on a suction, or low pressure, side of a fuel pump, as opposed to being disposed on the high pressure side. In some embodiments, the described fuel water separator filter may be disposed on the high pressure side of a fuel pump.

The fuel water separator filter is configured to be housed in a filter housing that is formed with an isolated water sump. The water sump is configured to be isolated from water that is stripped from the fuel by the first stage of the water separating layers. The isolated water sump is formed in the filter housing separate from the filter, i.e. the filter does not contribute to forming the isolated water sump, and the incoming fuel is separated from the water sump. The filter housing may be pre-formed with the isolated water sump, or an existing filter housing may be modified to create the isolated water sump.

Figure 1:
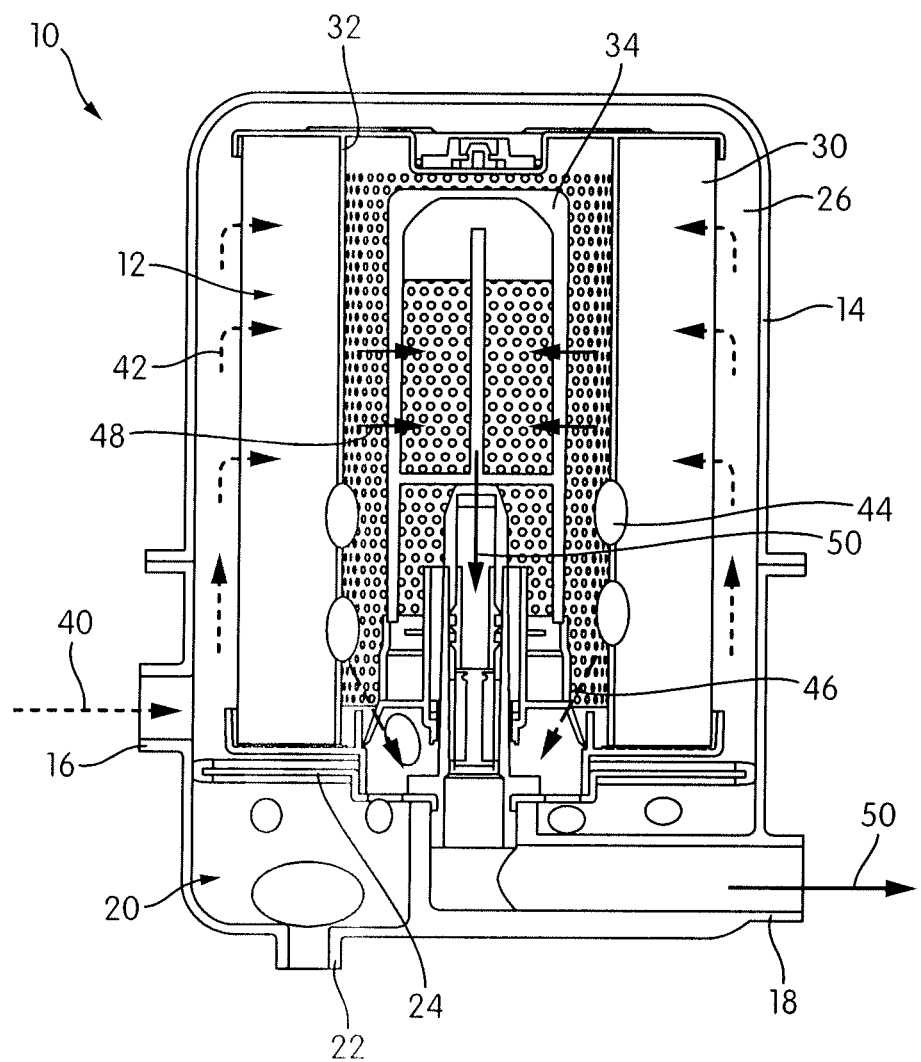
FIG. 1 is a cross-sectional view of a fuel water separator filter installed in a filter housing.

With reference now to FIG. 1, a filter assembly 10 is illustrated that includes a fuel water separator filter 12 disposed within a filter housing 14. The housing 14 includes an inlet 16 through which fuel contaminated with water may enter, and an outlet 18 through which filtered fuel with water removed may flow downstream, such as to an engine. When used on the suction side, the outlet 18 is connected to a fuel pump (not shown) which pumps the fuel, such as to the engine.

The housing 14 defines an isolated water sump 20 at the base thereof that is configured to collect water that is separated from the fuel by the filter 12. A drain port 22 is provided that permits draining of water from the water sump 20. The isolated water sump 20 is formed by a wall 24 that is disposed within the housing 14, and that separates the interior space of the housing 14 into the water sump 20 and an upper filter chamber 26 that receives the filter 12.

The filter 12 may be provided with at least three water separating layers. In the example shown in FIG. 1, three water separating layers are provided, with a first water separating layer formed by a filtration media 30, a second water separating layer formed by a coalescing layer 32, and a third water separating layer formed by a hydrophobic screen layer 34.

With reference to FIG. 1 and the flow paths shown therein, the incoming fuel enters the filter chamber 26 which is separated from the water sump 20 along the incoming fuel flow path 40. The fuel flows into an area outside the filter 12 and the water sump 20, and then into the filtration media 30 as shown by the unfiltered fuel flow path 42. Water that is stripped from the fuel by the filtration media 30 sinks to the base of the filter chamber 26 outside of the filter. The fuel passes through the filtration media 30 and then to the coalescing layer 32 which coalesces water within the fuel to form large water droplets 44 that sink to the base of the filter 12 and through suitable passageways in the wall 24 into the water sump 20 as shown by the water droplet flow path 46. The fuel then flows through the hydrophobic screen layer 34 as shown by the intermediate fuel flow path 48 and any additional water droplets in the fuel are stripped out by the hydrophobic screen layer 34 and sink down into the water sump 20. The filtered fuel then flows into a standpipe structure of the filter housing 14 which forms part of the outlet 18 along the filtered fuel flow path 50. The outer filter may seal against a wall of the water sump to prevent unfiltered fuel and water from bypassing the filter 12.

The water that is stripped from the fuel by the filtration media 30 may flow into the water sump 20 during filter service. For example, during servicing, when the filter 12 is removed from the filter housing, the water separated by the filtration media 30 may drain through the passageways in the wall 24 and into the water sump 20.

The filter housing 14 may include an upper housing and a lower housing that are detachably connected together and sealed to one another at a connection point. The upper housing and the lower housing may be detachably connected to one another using any suitable attachment mechanism, for example a clamp mechanism, bolts, or any other mechanism known in the art. The lower housing may include both the inlet 16 and the outlet 18.

The filter housing may be pre-formed with the isolated water sump 20, or an existing filter housing may be modified to create the isolated water sump 20. The isolated water sump 20 may be formed in the lower housing by modifying an existing lower housing. In particular, the wall 24 may be a structure that is installed within the lower housing to create the water sump 20. The wall 24 may be a generally plate-like structure with an outer perimeter edge that generally matches the interior surface of the lower housing beneath the fuel inlet 16. A sealing gasket may be disposed on the outer perimeter edge of the wall 24 to seal with the interior surface of the housing to prevent fuel leakage between the perimeter edge and the housing.

The wall 24 also includes a central opening to accommodate a standpipe or fuel flow. A plurality of openings or passageways may be formed through the wall 24 to allow water to flow through the wall and into the water sump 20.

Optionally, a standpipe structure may be secured to a fuel outlet structure of the housing 14 to form a continuation of the outlet 18. The standpipe structure may be secured to an upwardly extending post formed in the lower housing 14. The standpipe structure may include a bottom end portion that is secured to the post, for example by fitting into the post and being secured to the post in any suitable manner, such as using threads, friction, an adhesive, or thermal bonding. An upper portion of the standpipe may extend upwardly into the inner filter when the filter 12 is installed (as shown in FIG. 1). In use, fuel that has been filtered by the filter 12 may enter the upper portion of the standpipe structure through one or more inlet passages formed in the upper portion, for example in the side or at the top end thereof, and then continue on through the outlet 18.

In one embodiment, the standpipe structure may be provided with a valve mechanism that forms part of a no filter, no run system. The valve mechanism may be designed to control flow into and/or through the standpipe structure and the remainder of the outlet 18, with the valve mechanism being located so as to be engaged by a valve actuating portion of the filter 12, when the filter 12 is installed in the filter housing 14. When a filter with the correct valve actuating portion is installed, the valve mechanism permits fuel flow into and through the standpipe structure. When no filter is installed, or when an incorrect filter having no valve actuating portion or having an incorrect valve actuating portion is installed, the valve mechanism prevents all fuel flow through the standpipe structure or limits the fuel flow to an amount insufficient to permit engine operation. Any valve mechanism that is configured to achieve these functions may be utilized.

The filter 12 is configured as a filter-in-filter construction with an outer filter and an inner filter. The inner filter is designed to fit within the outer filter and connect thereto such that the outer and inner filters are secured to one another. In one embodiment, the filter-in-filter may be configured such that the outer and inner filters are configured in a concentric arrangement. The outer and inner filters may have any appropriate shape, such as a cylindrical shape.

The outer filter includes the filtration media 30 which may be any filtration media that is suitable for filtering the fuel by removing particulate contaminants. In one example, the filtration media 30 may include pleated paper filtration media. The filtration media 30 may be arranged into a closed configuration or ring having a first end and a second end and circumscribing a central cavity having a longitudinal axis. The filtration media 30 may have any suitable cross-sectional shape defining the central cavity, such as circular, triangular, oval, or the like.

An embodiment of the filter is depicted in FIGS. 2-7. The filter 112 includes an outer filter 160 and an inner filter 162. The outer filter includes filtration media 130. A first endplate 178 is sealingly attached to the first end 172 of the filtration media 130 to close the first end 172 of the filtration media 130, and a second endplate 180 is sealingly attached to the second end 174 of the filtration media 130 to close the second end 174 of the filtration media. A coalescing layer 132 is secured to the interior side of the media 130 and extends from the first endplate 178 to the second endplate 180. A centertube 190 is secured to the interior of the coalescing layer 132 and extends substantially from the first endplate 178 to the second endplate 180 to help support the inner diameter of the media 130 and prevent it from collapsing. The centertube 190 may include perforation openings 194 configured to allow the passage of fuel therethrough. In addition, an optional half outer wrap, the construction of which is known, may be disposed around the outer circumference of the filtration media 130.

The first endplate 178 is generally constructed without fluid flow passageways, such that there is no fuel flow through the first endplate 178. However, an optional air vent 186 may be provided in the first endplate 178 to allow venting of air from the interior of the outer filter 160.

Figure 2:
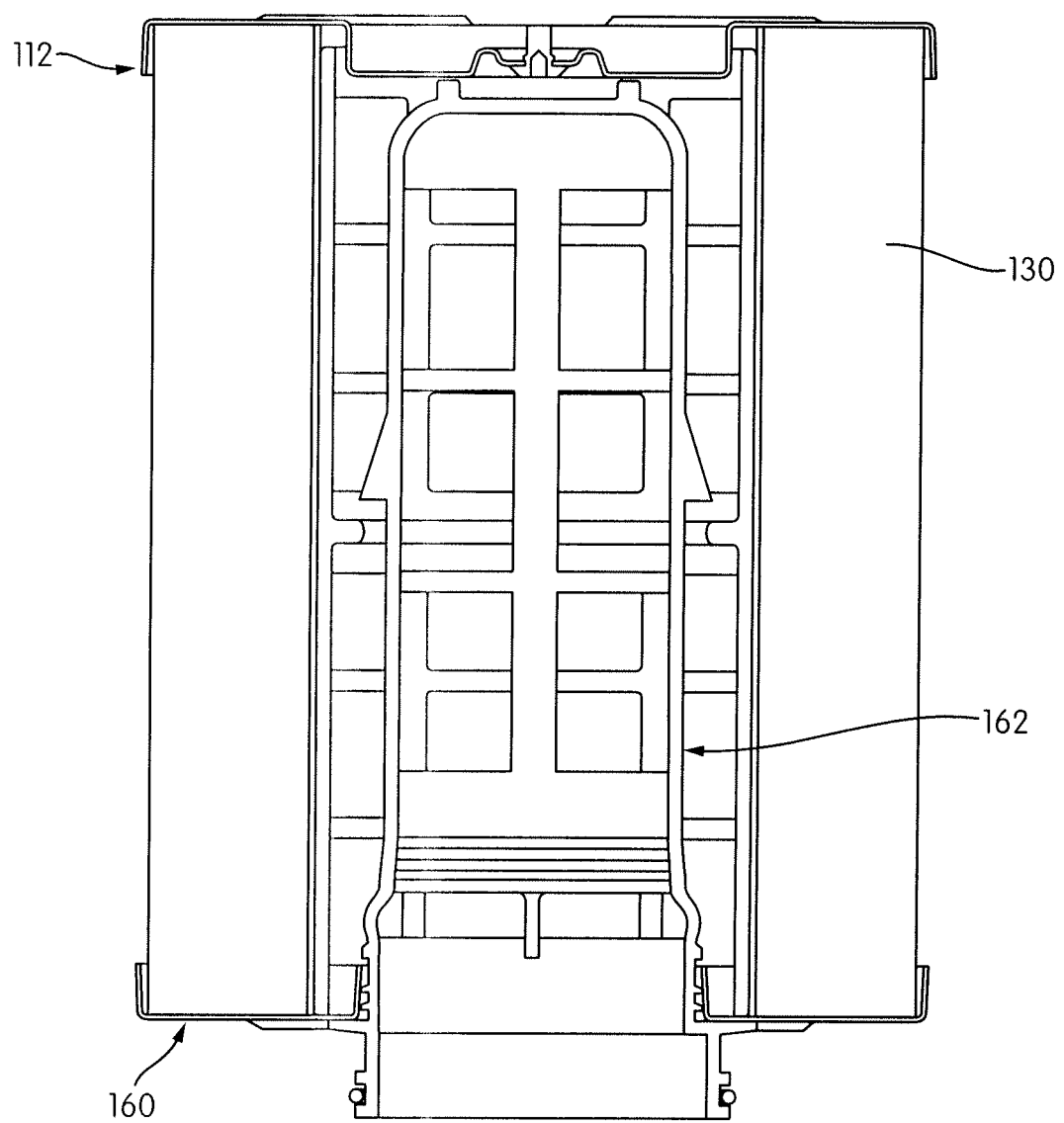
FIG. 2 is a cross-sectional view of a fuel water separator filter, according to one embodiment.
Figure 3:
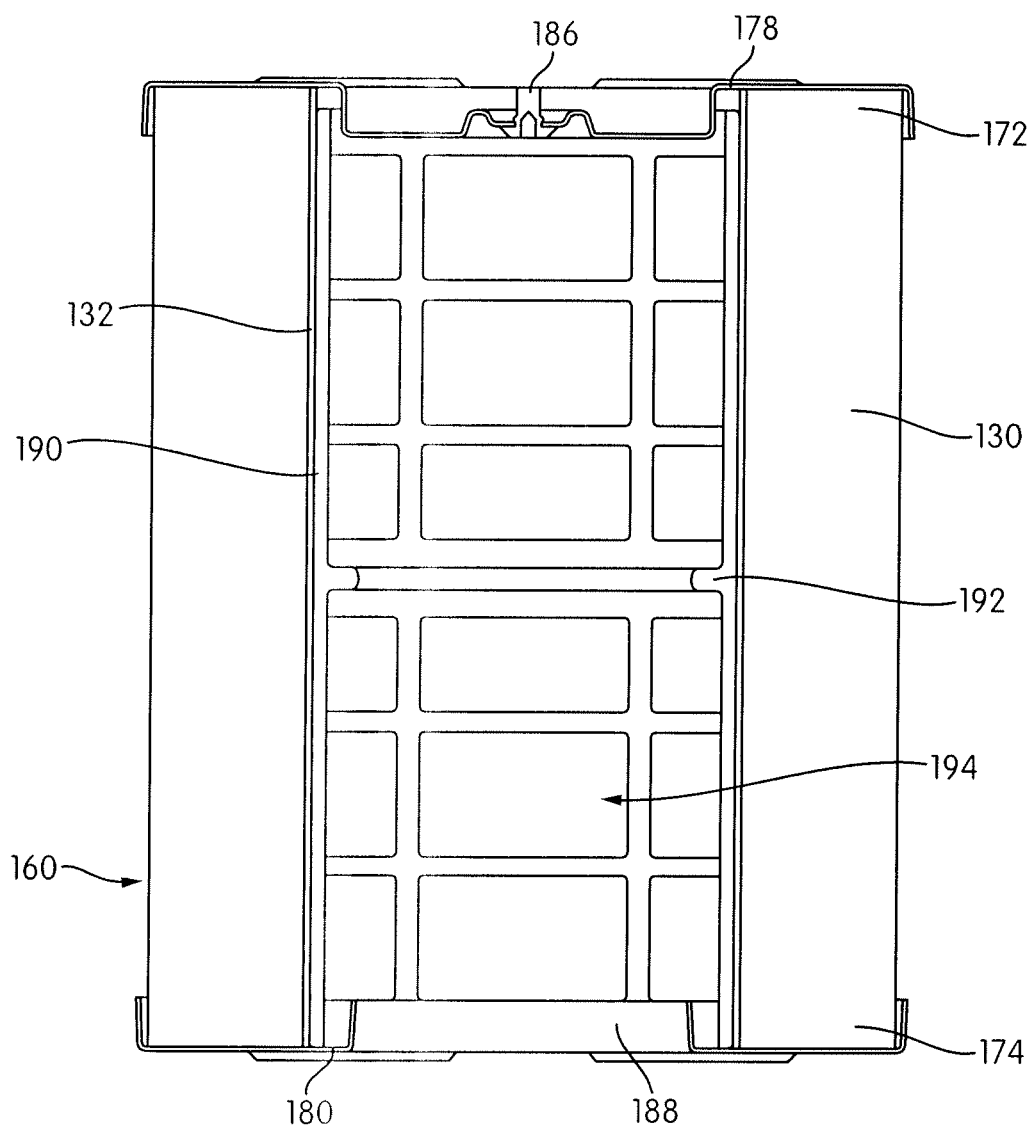
FIG. 3 is a cross-sectional view of an outer filter of the embodiment of FIG. 2.

The second endplate 180 includes a central opening formed therein, and a neck 188 surrounding the opening and extending upwardly from the endplate 180 into the central cavity of the filter. The neck 188 is a circumferentially continuous structure configured to engage the inner filter 162 when the inner filter 162 is installed in the outer filter 160 through the central opening of the endplate 180. As shown in FIG. 2, the inner filter 162 is spaced radially inward from the centertube 190 and the coalescing layer 132, producing a gap. The neck 188 of the second endplate 180 is radially positioned so as to be disposed within the gap.

Figure 4:
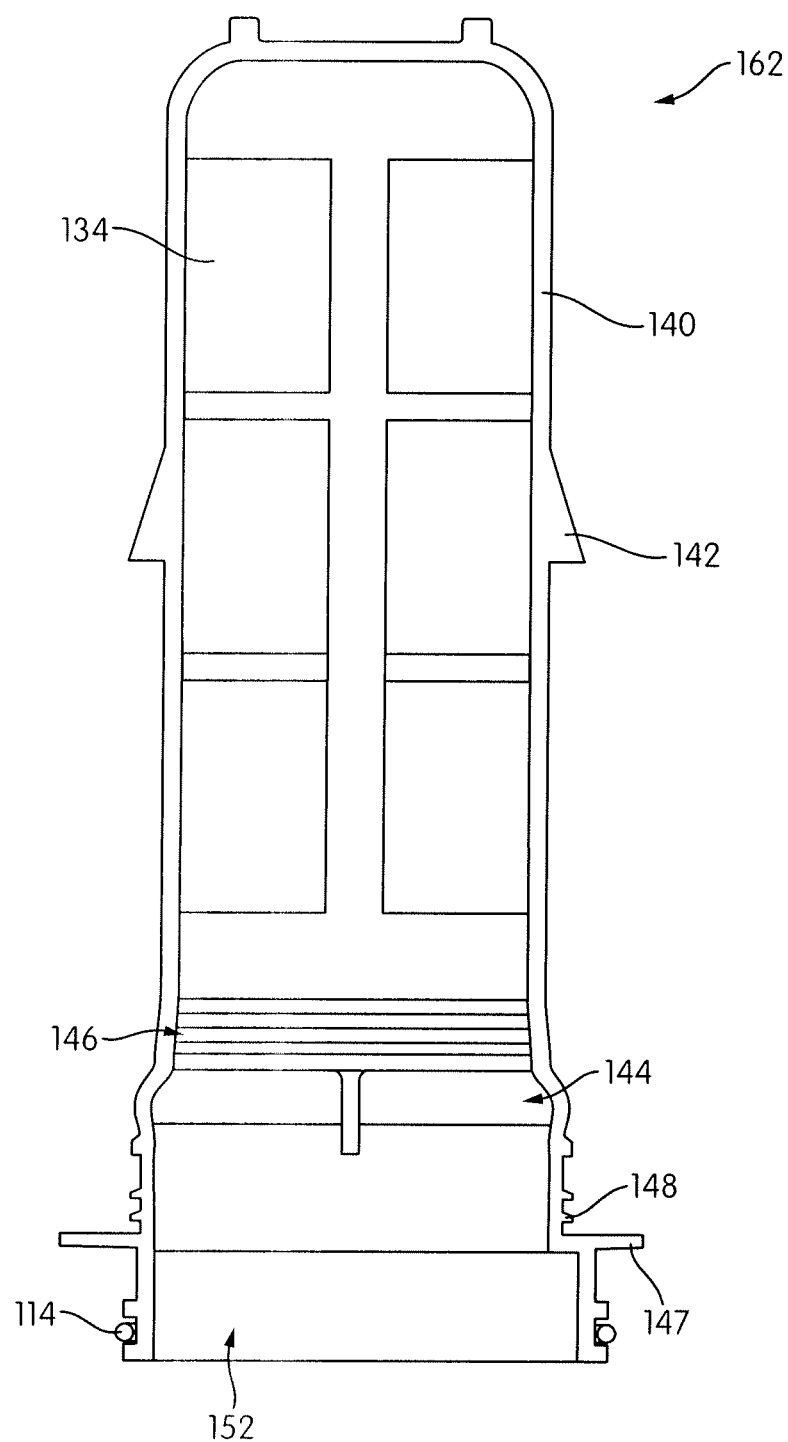
FIG. 4 is a cross-sectional view of an inner filter of the embodiment of FIG. 2.

The centertube 190 may include an anti-backoff element, such as an anti-backoff protrusion 192. The anti-backoff protrusion may extend into the central cavity of the outer filter 160, for example the anti-backoff protrusion 192 may extend in a direction substantially orthogonal to an interior surface of the centertube 190, and may be in the form of a rib extending radially inward from the surface of the centertube 190. The anti-backoff protrusion 192 is configured to engage the inner filter 162 and prevent the inner filter 162 from backing out of the outer filter 160 when the filters are combined. As shown in FIG. 4, the portion of the inner filter 162 that engages the anti-backoff protrusion 192 may be a snap-fit prong 142. The anti-backoff protrusion 192 and corresponding snap-fit prong 142 may be a means for preventing the inner filter 162 from disengaging the outer filter 160.

The inner filter 162 may include a frame structure 140. The snap-fit prong 142 may be located on the frame structure 140, and may be formed as a unitary structure therewith. The frame structure 140 may include a sealing surface 146 configured to seal against a sealing surface 156 of a standpipe structure 150. The sealing surface 146 may include one or more seals, such as elastomeric seals or o-rings. Alternatively, the sealing surface 146 may include a plurality of projections formed integrally with the frame structure 140 and configured to seal against the sealing surface 156 of the standpipe structure 150. Openings 144 may be formed in the frame structure 140, such that water separated from the fuel by the filter may flow to a water sump. The frame structure 140 includes an open end 152, configured to accept the standpipe structure 150 and to allow water to flow to the water sump. A seal 114 is provided on an exterior of the frame structure 140 at the open end 152 to seal the frame structure against a surface of the filter housing. The seal 114 may be an o-ring, and may be disposed in a seal locating structure, such as a channel, formed on the frame structure 140.

A filter media 134 is supported by the frame structure 140 and disposed over the openings therein. The filter media 134 may be configured to separate remaining water and/or particulate matter from the fuel before it passes in to the center cavity of the inner filter 162. The filter media 134 may be a hydrophobic screen configured to prevent the passage of water present in the fuel therethrough.

The frame structure 140 may also include a collar 147 configured to contact the second endplate 180 when the inner filter 162 is installed in the outer filter 160. The collar 147 may extend in a direction substantially orthogonal to the longitudinal axis of the frame structure 140, and have a diameter that exceeds the diameter of the central opening of the second endplate 180. The collar 147 is configured to prevent the over insertion of the inner filter 162 and enhance a seal between the frame structure 140 and the second endplate 180.

The frame structure 140 may be formed from any suitable material by any suitable process. A molding process, such as an injection molding process, may be employed to form the frame structure 140. The frame structure 140 may be formed in two or more pieces, which are later attached together. For example, a base portion of the frame structure which includes the collar may be attached to a molded upper portion that includes the filter media by any suitable attachment method.

The inner filter 162 may include three separate seals: the sealing surface 146 which seals against the standpipe structure, the seal 114 which seals against the filter housing, and sealing projections 148 which seal against the second endplate 180. Including all of the seals on the inner filter 162 simplifies the production of the filter. For example, the first endplate 178 and second endplate 180 may be produced from relatively inexpensive materials, such as metal or plastisol, on existing production equipment, while the inner filter 162 is formed from materials, such as plastic or epoxy, and by methods that facilitate the formation of effective seals. In this way, the cost of producing the filter may be reduced. Additionally, the snap-lock features of the inner filter 162 and the outer filter 160 allow for a simplified filter assembly process that does not require additional gaskets or glue, and prevents the disengagement of the inner filter 162 from the outer filter 160.

Figure 5:
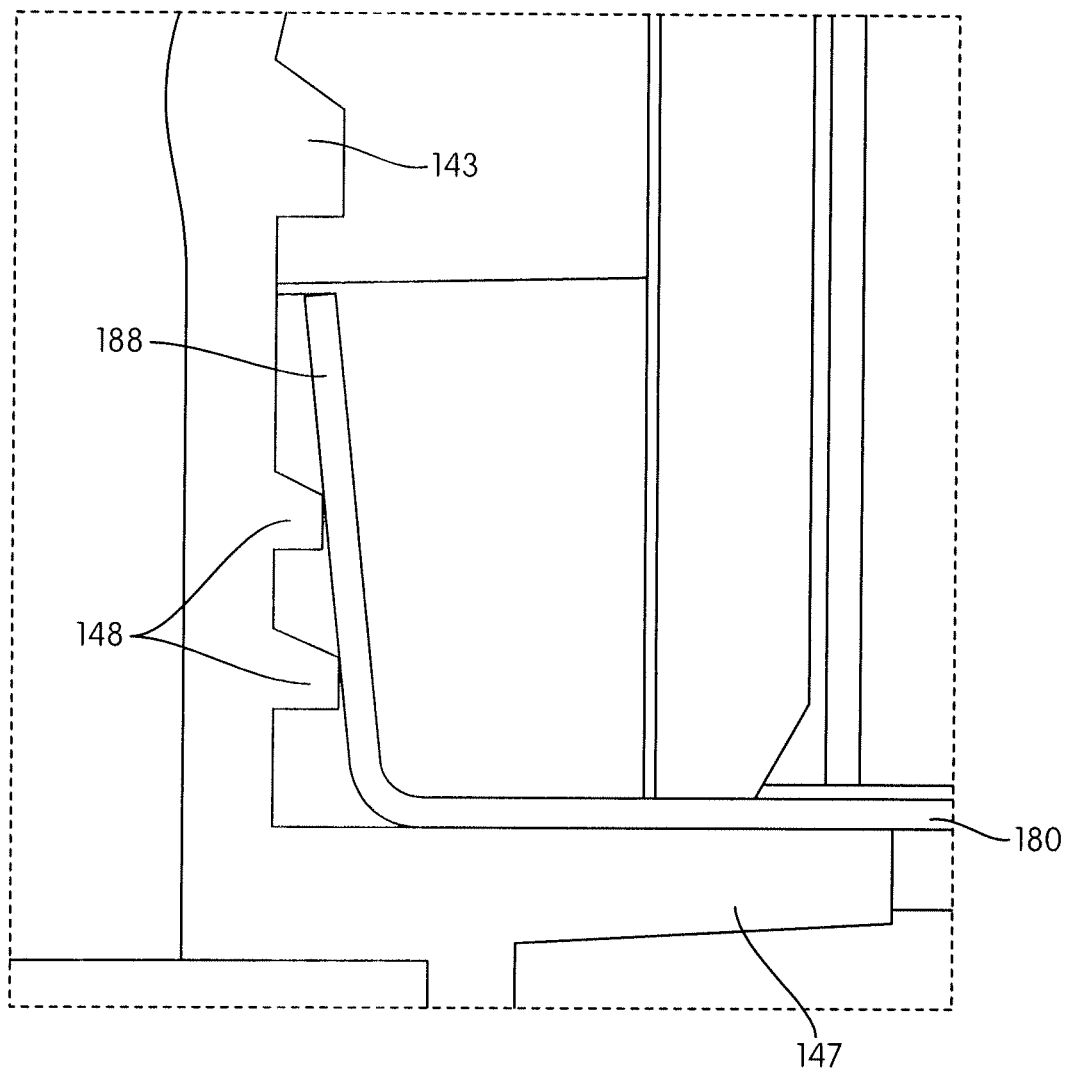
FIG. 5 is a detailed cross-sectional view of a snap-lock feature attaching the outer filter of FIG. 3 and the inner filter of FIG. 4.

The frame structure 140 also includes a snap-lock projection 143 and the sealing projections 148, each of which is configured to engage the neck 188 of the second endplate 180. The neck 188 may have a diameter that tapers towards the interior of the inner filter 162. In other words, the diameter of the neck 188 at the free end may be less than the diameter of the neck 188 at the point of attachment to the second endplate 180. The geometry of the neck 188 allows the snap-lock projection 143 to prevent the removal of the inner filter 162 after installation in the outer filter 160. As shown in FIG. 5, the free end of the neck 188 is located radially inward of the snap-lock projection 143 when the inner filter 162 is fully installed in the outer filter 160, and the free end of the neck 188 is prevented from passing over the snap-lock projection 143. For example, the snap-lock projection may have a face adjacent to the free end of the neck 188 when the inner filter 162 is installed that extends substantially orthogonal to the longitudinal axis of the frame structure 140.

The sealing projections 148 of the frame structure 140 are configured such that the neck 188 bears against the sealing projections 148 with sufficient force to produce a seal that prevents undesired fluid flow between the frame structure 140 and the neck 188. The sealing projections 148 may extend from the frame structure 140 to an extent that sufficient contact is produced with the neck 188 while also allowing the free end of the neck 188 to engage the snap-lock projection 143. The frame structure may include any appropriate number of sealing projections 148, such as two sealing projections. A plurality of sealing projections 148 may be provided where each sealing projection extends from the frame structure to a lesser height than the sealing projections disposed closer to the collar 147. Such a configuration may ensure that each sealing projection 148 is in contact with the neck 188 when the inner filter 162 is installed in the outer filter 160.

Figure 6:
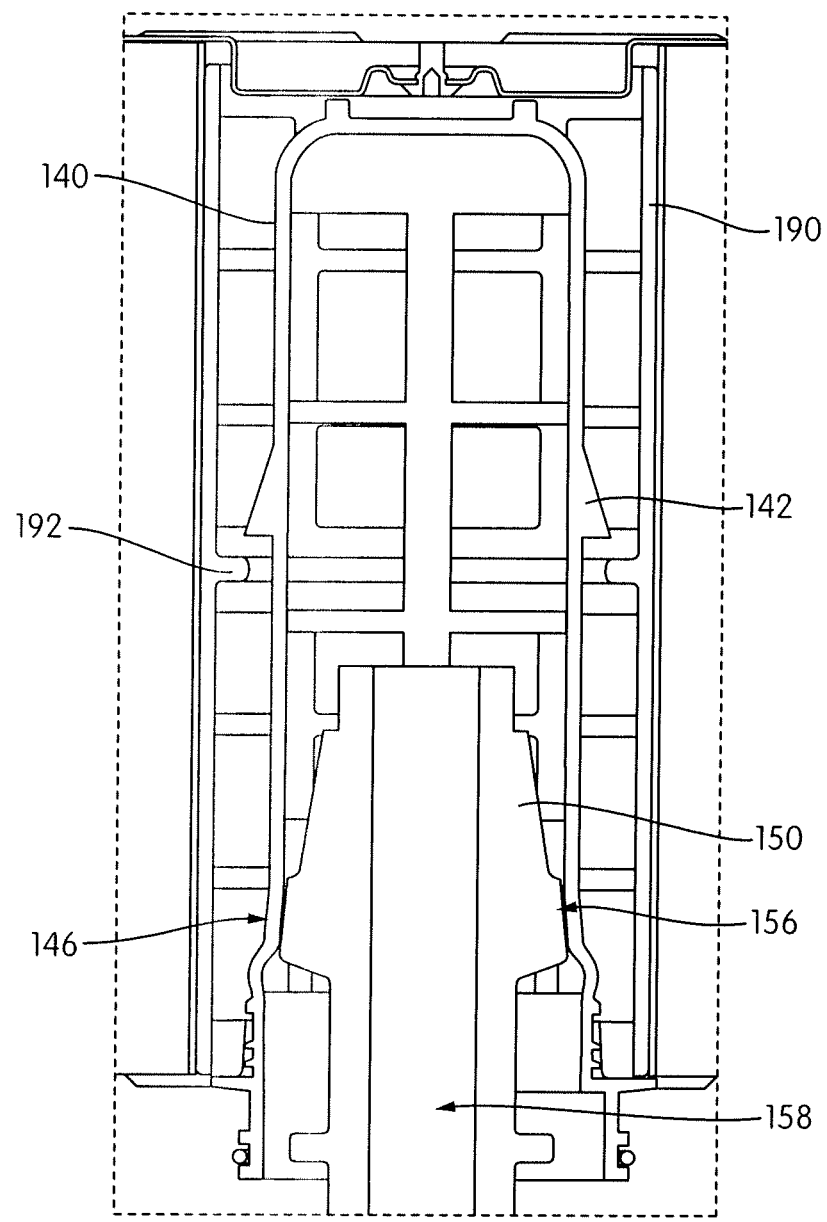
FIG. 6 is a cross-sectional view of the fuel water separator of FIG. 2 engaged with a standpipe structure.
Figure 7:
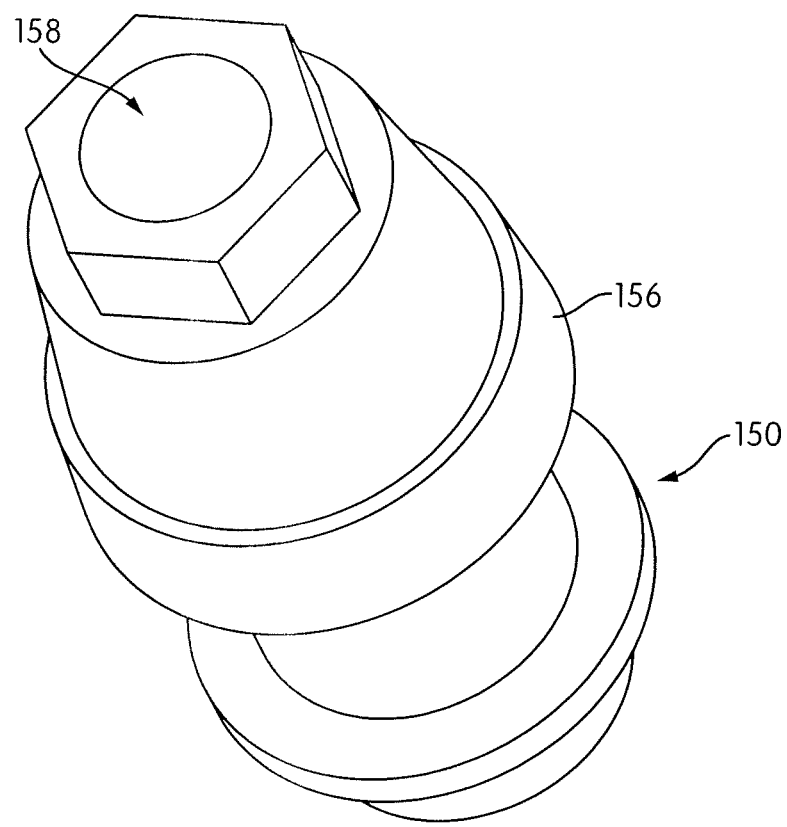
FIG. 7 is a perspective view of the standpipe structure shown in FIG. 6.

As shown in FIGS. 6 and 7, the standpipe structure 150 may include a fuel outlet passage 158 in fluid communication with the central cavity of the inner filter 162. When the filter is properly engaged with the standpipe structure 150, the fuel outlet passage 158 receives fuel only from the central cavity of the inner filter 162. In other words, the fuel that enters the fuel outlet passage 158 has passed through the outer filter 160 and the inner filter 162. The seal produced between the sealing surface 156 of the standpipe structure 150 and the sealing surface 146 of the frame structure 140 prevents fluid from entering the central cavity of the inner filter 162, and thereby the fuel outlet passage 158, without passing through the inner filter 162. The sealing surface 156 of the standpipe structure 150 may extend along a direction oblique to the longitudinal axis of the filter, such that the sealing surface 156 of the standpipe structure 150 engages the sealing surface 146 of the frame structure 140 while accommodating slight misalignments or differences due to manufacturing tolerances. According to another embodiment, the sealing surface of the standpipe structure may be located on an inner diameter of the standpipe structure.

Figure 8:
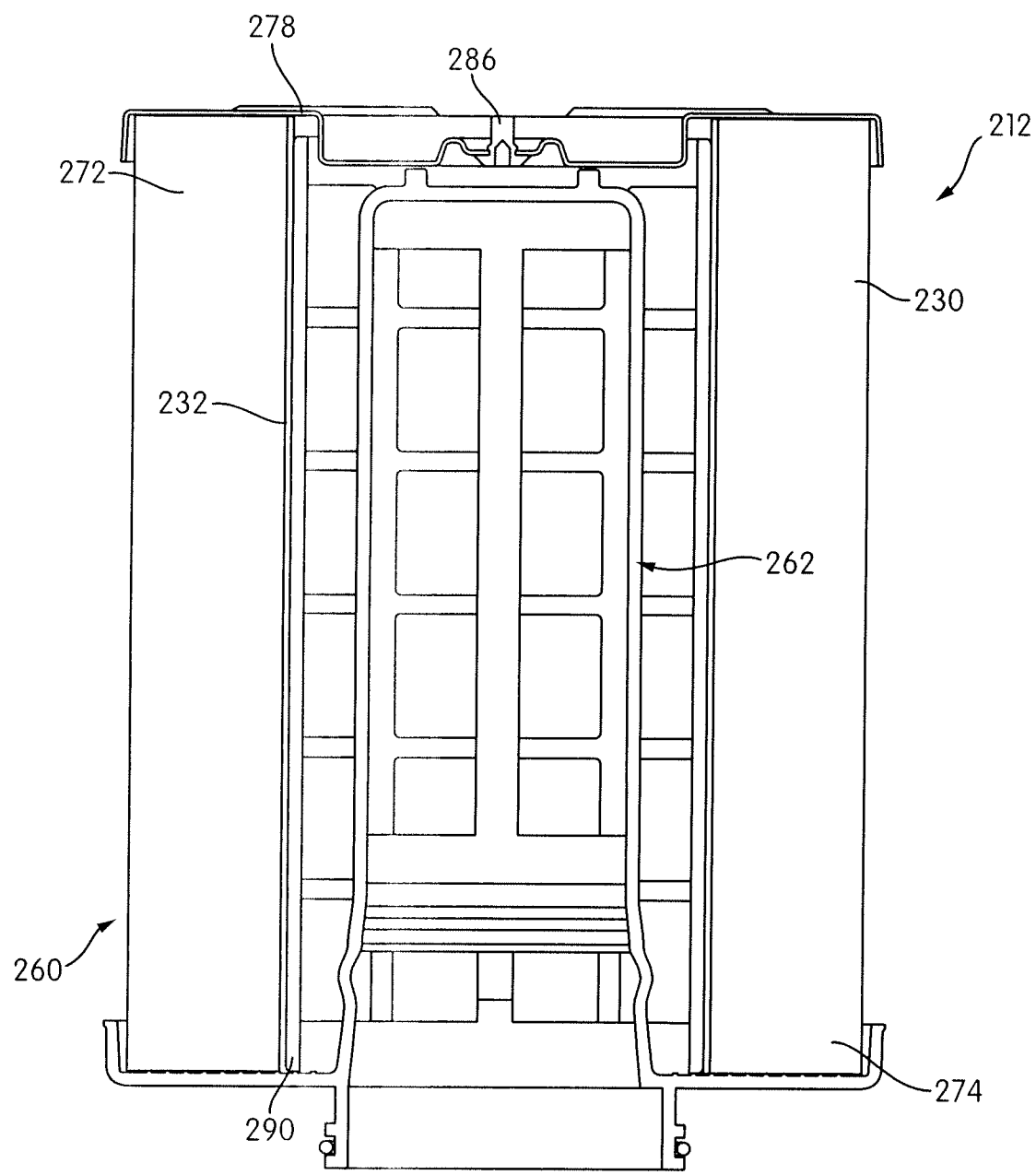
FIG. 8 is a cross-sectional view of a fuel water separator filter, according to another embodiment.
Figure 9:
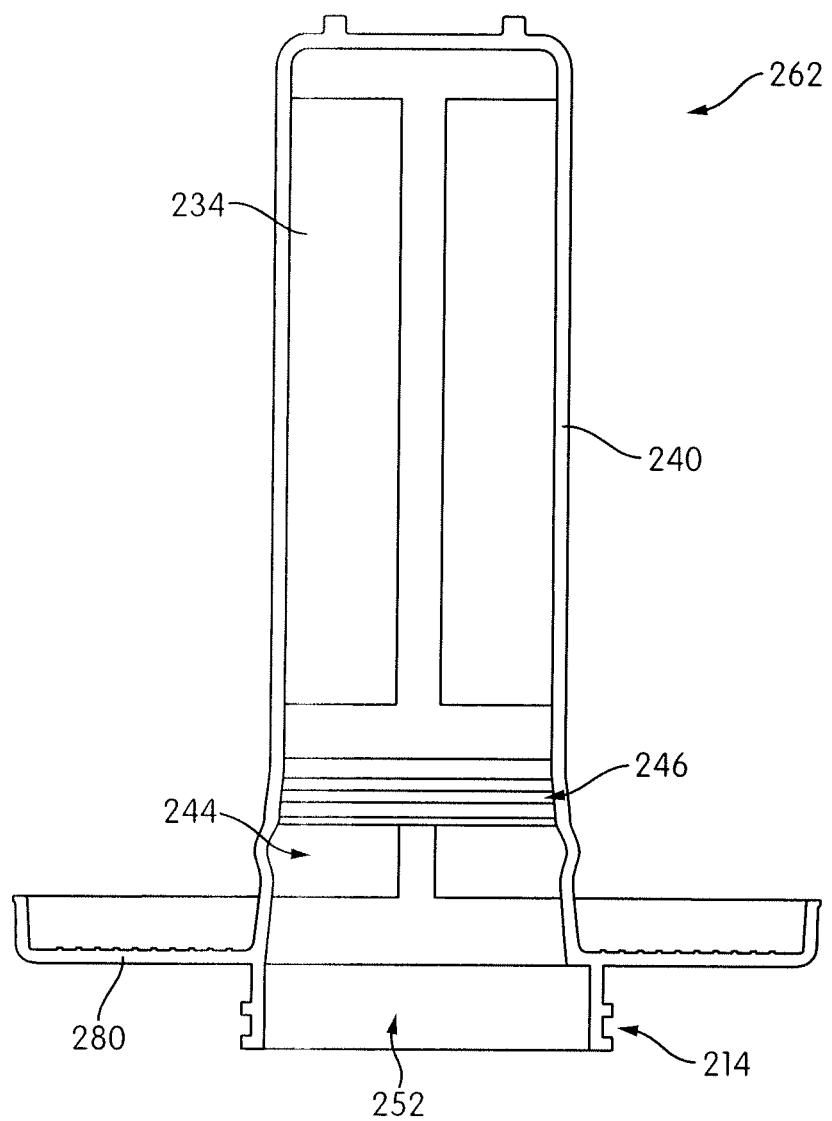
FIG. 9 is a cross-sectional view of an inner filter of the embodiment of FIG. 8.
Figure 10:
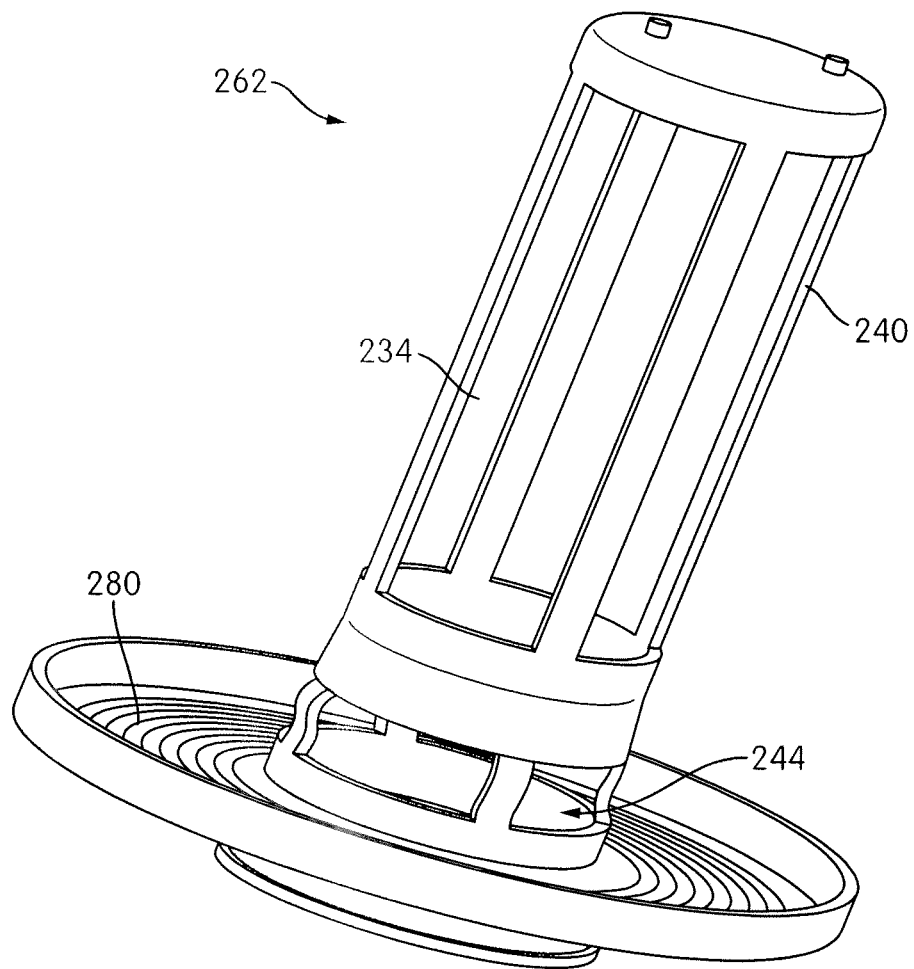
FIG. 10 is a perspective view of the inner filter of the embodiment of FIG. 8.

Another embodiment of the filter 212 is shown in FIGS. 8-10. The filter includes an outer filter 260 and an inner filter 262.

The outer filter includes filtration media 230. A first endplate 278 is sealingly attached to the first end 272 of the filtration media 230 to close the first end 272 of the filtration media 230. A second endplate 280 is part of the inner filter 262 and is sealingly attached to the second end 274 of the filtration media 230 to close the second end 274 of the filtration media 230. A coalescing layer 232 is secured to the interior side of the filtration media 230 and extends from the first endplate 278 to the second endplate 280. A centertube 290 is secured to the interior of the coalescing layer 232 and extends substantially from the first endplate 278 to the second endplate 280 to help support the inner diameter of the filtration media 230 and prevent it from collapsing. The centertube 290 may include perforation openings to allow the passage of fuel therethrough. In addition, an optional half outer wrap, the construction of which is known, may be disposed around the outer circumference of the media 230.

The first endplate 278 is generally constructed without fluid flow passageways, such that there is no fuel flow through the first endplate 278. However, if deemed appropriate, an optional air vent 286 may be provided in the first endplate 278 to allow venting of air from the interior of the outer filter 260.

The second endplate 280 may be formed integrally with the frame structure 240 of the inner filter 262 as a single unitary element. The second endplate 280 includes a central opening 252 that is configured to accept a standpipe structure. As shown in FIG. 8, the inner filter 262 is spaced radially inward from the centertube 290 and the coalescing layer 232, producing a gap.

The frame structure 240 may include a sealing surface 246 configured to seal against a sealing surface of a standpipe structure. The sealing surface 246 may include one or more seals, such as elastomeric seals or o-rings. Alternatively, the sealing surface 246 may include a plurality of projections formed integrally with the frame structure 240 and configured to contact the sealing surface of the standpipe structure. Openings 244 may be formed in the frame structure 240, such that water separated from the fuel by the filter may flow to a water sump. The frame structure 240 includes a central opening 252, configured to accept the standpipe structure. A seal 214 is provided on an exterior of the frame structure 240 proximate the central opening 252 to seal the frame structure against a surface of the filter housing. The seal 214 may be an o-ring, and may be disposed in a seal locating structure, such as a channel, formed on the frame structure 240. The seal 214 may be formed on a portion of the frame structure 240 that extends beyond the second endplate 280 in a direction away from the interior of the filter.

A filter media 234 is supported by the frame structure 240 and disposed over openings therein. The filter media 234 may be configured to separate remaining water and/or particulate matter from the fuel before it passes in to the center of the inner filter 262. The filter media 234 may be a hydrophobic screen configured to prevent the passage of water present in the fuel therethrough.

The frame structure 240 and the second endplate 280 may be formed from any suitable material by any suitable process. A molding process, such as an injection molding process may be employed to form the frame structure 240 and the second endplate 280 as a single unitary structure.

The inner filter 262 may include two separate seals: the sealing surface 246 which seals against the standpipe structure, and the seal 214 which seals against the filter housing. Including all of the sealing surfaces on the inner filter 162 simplifies the production of the filter. Additionally, forming the second endplate 280 and the frame structure 240 as a single element reduces the number of parts in the filter, and eliminates a sealing junction between the second endplate 280 and the frame structure 240. In this way, the cost of producing the filter may be reduced. The second endplate 280 may be sealingly attached to the filtration media 230 of the outer filter 260 by an adhesive, such as glue.

Another embodiment of the filter 312 is shown in FIGS. 11-16. The filter includes an outer filter 360 and an inner filter 362.

The outer filter 360 includes filtration media 330. A first endplate 378 is sealingly attached to the first end 372 of the filtration media 330 to close the first end 372 of the filtration media 330. A second endplate 380 is sealingly attached to the second end 374 of the filtration media 330 to close the second end 374 of the filtration media 330. A coalescing layer 332 is secured to the interior side of the filtration media 330 and extends from the first endplate 378 to the second endplate 380. A centertube 390 is secured to the interior of the coalescing layer 332 and extends substantially from the first endplate 378 to the second endplate 380 to help support the inner diameter of the filtration media 330 and prevent it from collapsing. The centertube 390 may include perforation openings 394 to allow the passage of fuel therethrough. In addition, an optional half outer wrap 336, the construction of which is known, may be disposed around the outer circumference of the filtration media 330.

The first endplate 378 is generally constructed without fluid flow passageways, such that there is no fuel flow through the first endplate 378. However, if deemed appropriate, an optional air vent 386 may be provided in the first endplate 378 to allow venting of air from the interior of the outer filter 360.

Figure 11:
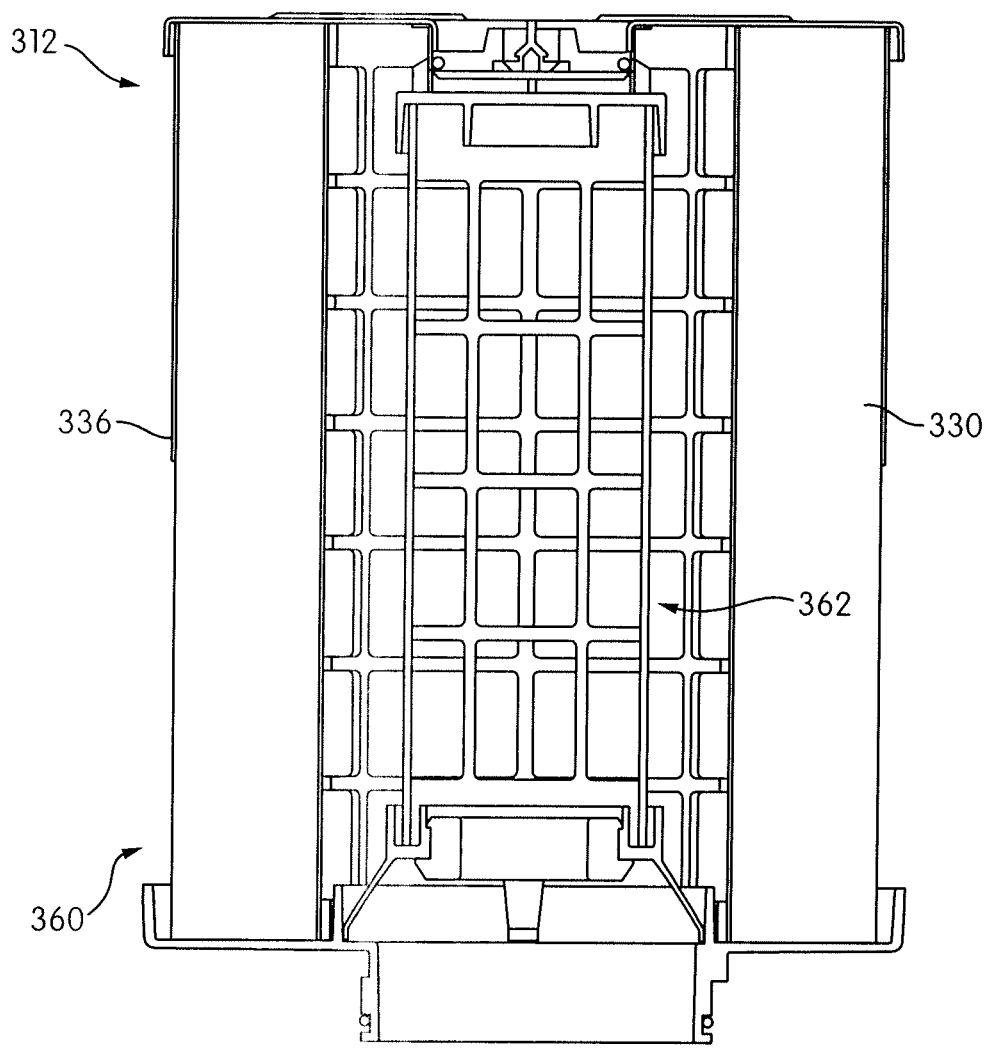
FIG. 11 is a cross-sectional view of a fuel water separator, according to another embodiment.
Figure 12:
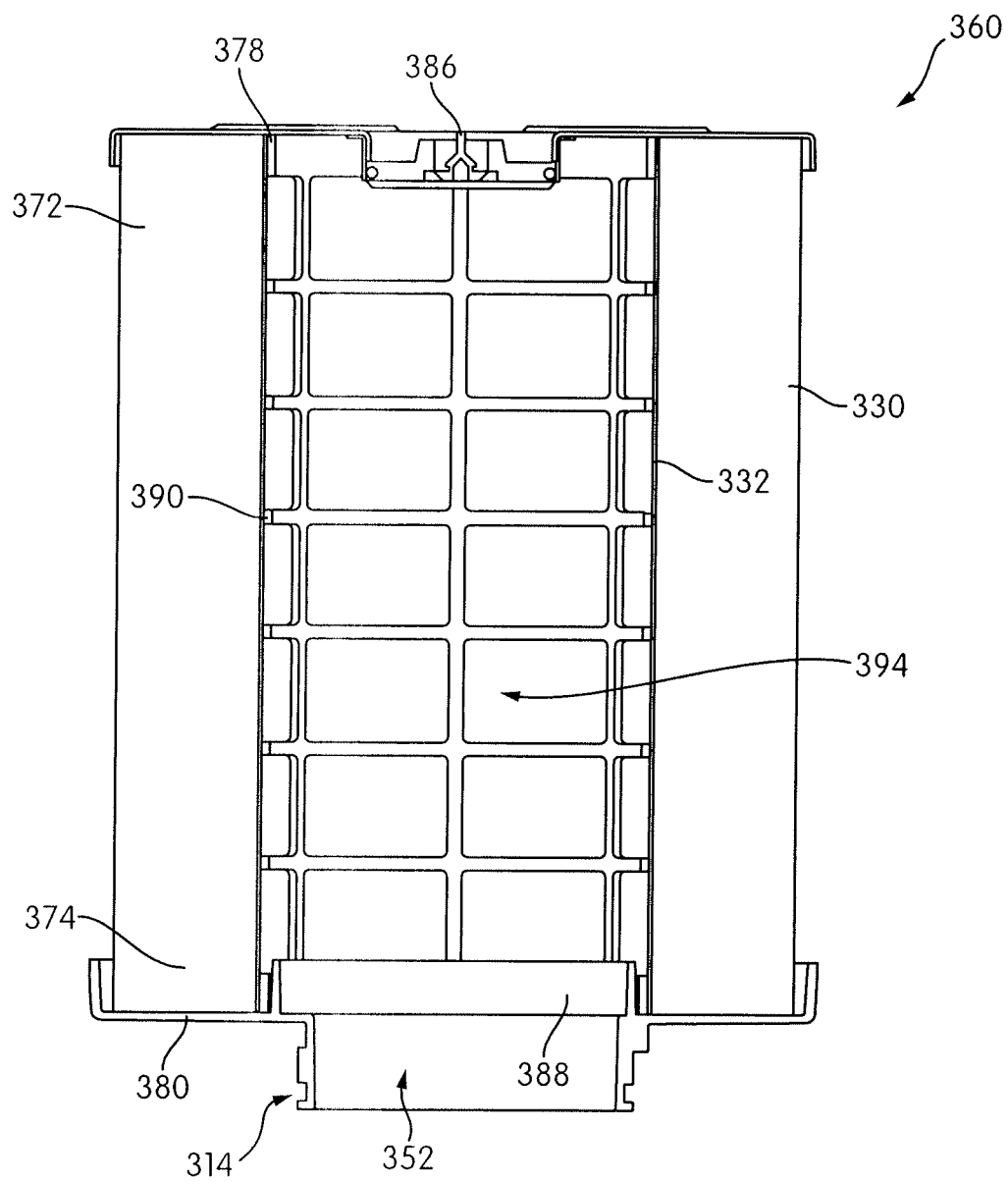
FIG. 12 is a cross-sectional view of the outer filter of the embodiment of FIG. 11.
Figure 13:
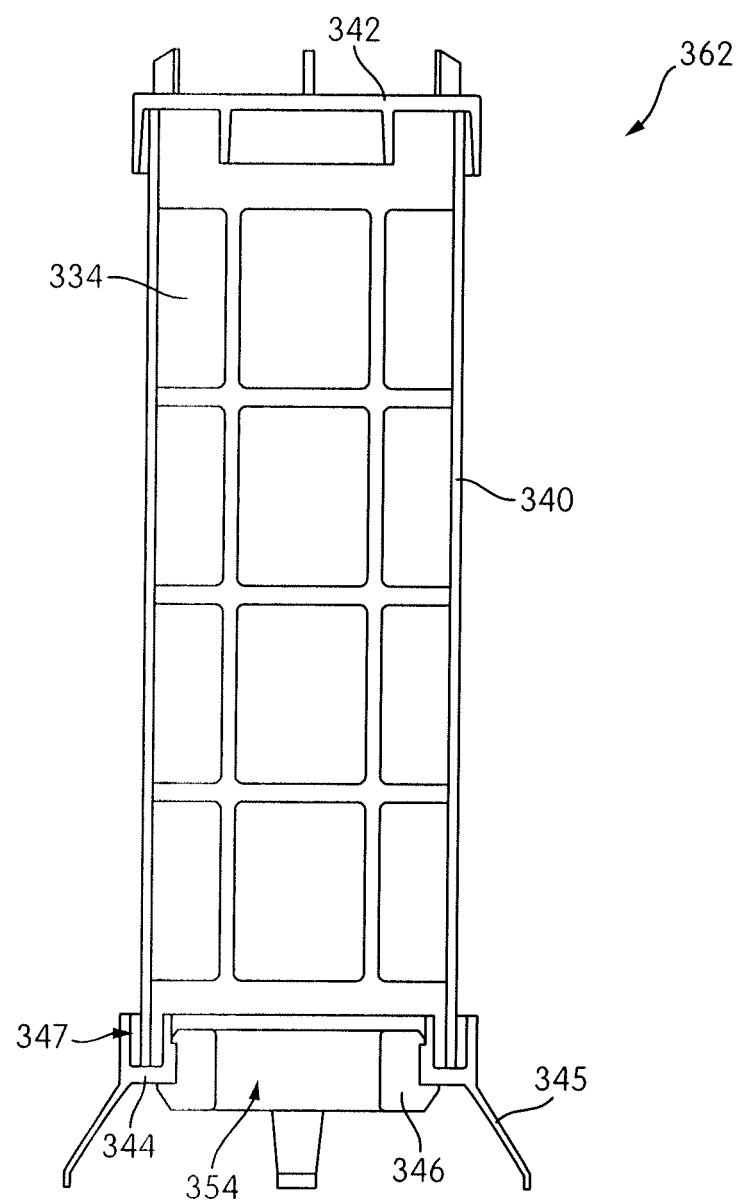
FIG. 13 is a cross-sectional view of an upper portion of the inner filter of the embodiment of FIG. 11.

The second endplate 380 includes a central opening 352 formed therein. A neck 388 extends upwardly from the endplate 380 into the central cavity of the filter. The neck 388 is a circumferentially continuous structure that is configured to engage the inner filter 362. As shown in FIG. 11, the inner filter 362 is spaced radially inward from the centertube 390 and the coalescing layer 332, producing a gap. The neck 388 is radially positioned so as to be disposed within the gap.

Figure 14:
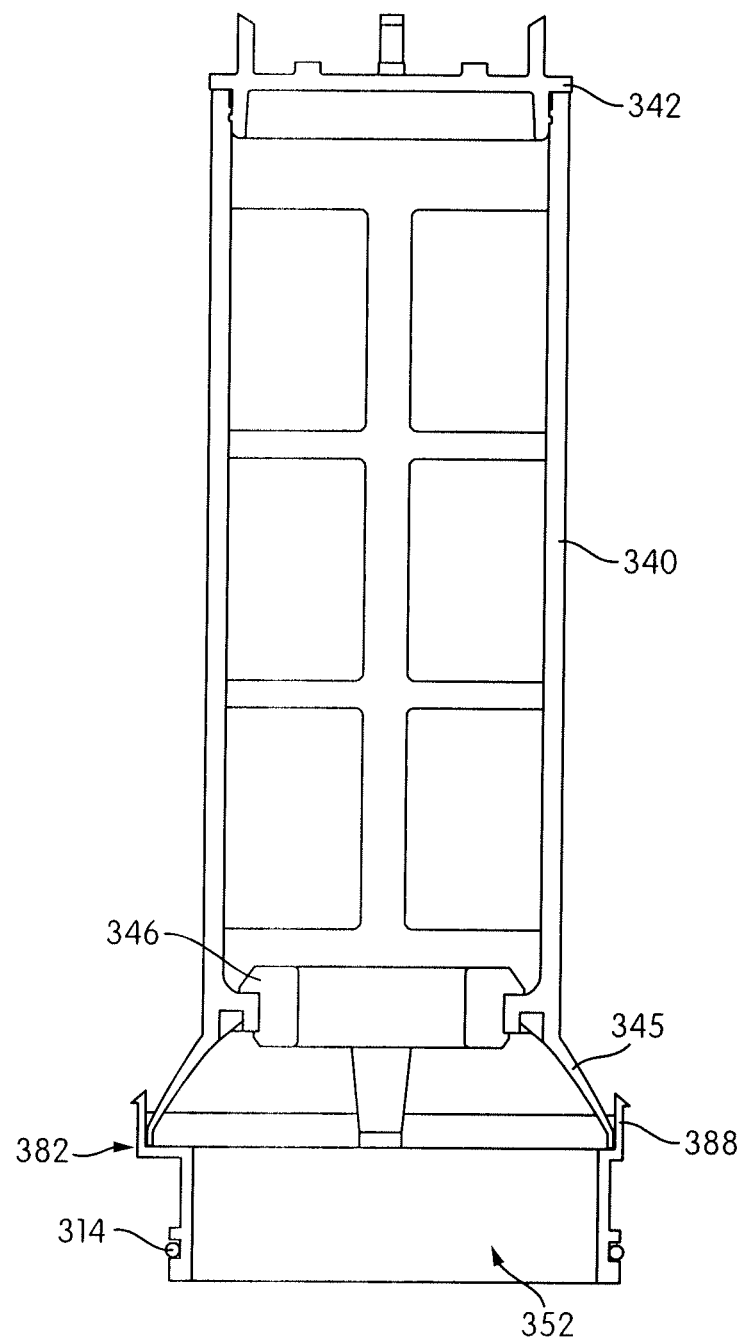
FIG. 14 is a cross-sectional view of the inner filter of the embodiment of FIG. 11.

The inner filter 362 may include a frame structure 340, a top cover 342 and a snap-lock structure 344. The snap-lock structure 344 may include a seal 346 configured to seal against a standpipe structure. The seal 346 may be an elastomeric seal, and may include an opening 354 configured to accept the standpipe structure. Openings may be formed in the snap-lock structure 344 between the snap-lock legs 345, such that water separated from the fuel by the filter may flow to a water sump. As shown in FIG. 14, the snap-lock legs are configured to engage the neck 388, and self-center the inner filter 362 with respect to the outer filter 360.

The neck 388 may be formed as a part of the second endplate 380 which includes a central opening 352 configured to accept the standpipe structure. Alternatively, the neck 388 may be formed as part of a base portion 382. The base portion may include snap-lock tabs 383 configured to engage the second end plate 380 when the filter is assembled. A seal 314 is provided on an exterior of the filter proximate the central opening 352 to seal the filter against a surface of the filter housing. The seal 314 may be an o-ring, and may be disposed in a seal locating structure, such as a channel, and may be provided on the base portion 382 or the second endplate 380.

A filter media 334 is supported by the frame structure 340 and disposed over openings therein. The filter media 334 may be configured to separate remaining water and/or particulate matter from the fuel before it passes in to the center of the inner filter 362. The filter media 334 may be a hydrophobic screen configured to prevent the passage of water present in the fuel therethrough.

The frame structure 340 may be formed from any suitable material by any suitable process. A molding process, such as an injection molding process, may be employed to form the frame structure 340. The frame structure 340 may be formed integrally with the snap-lock structure 344 and/or the top cover 342. Alternatively, the frame structure 340 may be formed separately from the snap-lock structure and/or the top cover 342.

The snap-lock structure 344 may be formed as separate element from the frame structure 340. The snap-lock structure 344 may include a channel 347 configured to engage the frame structure. The channel 347 of the snap-lock structure 344 may be configured such that fluid is prevented from flowing between the frame structure 340 and the snap-lock structure 344 when the inner filter 362 is installed in the outer filter 360.

Figure 15:
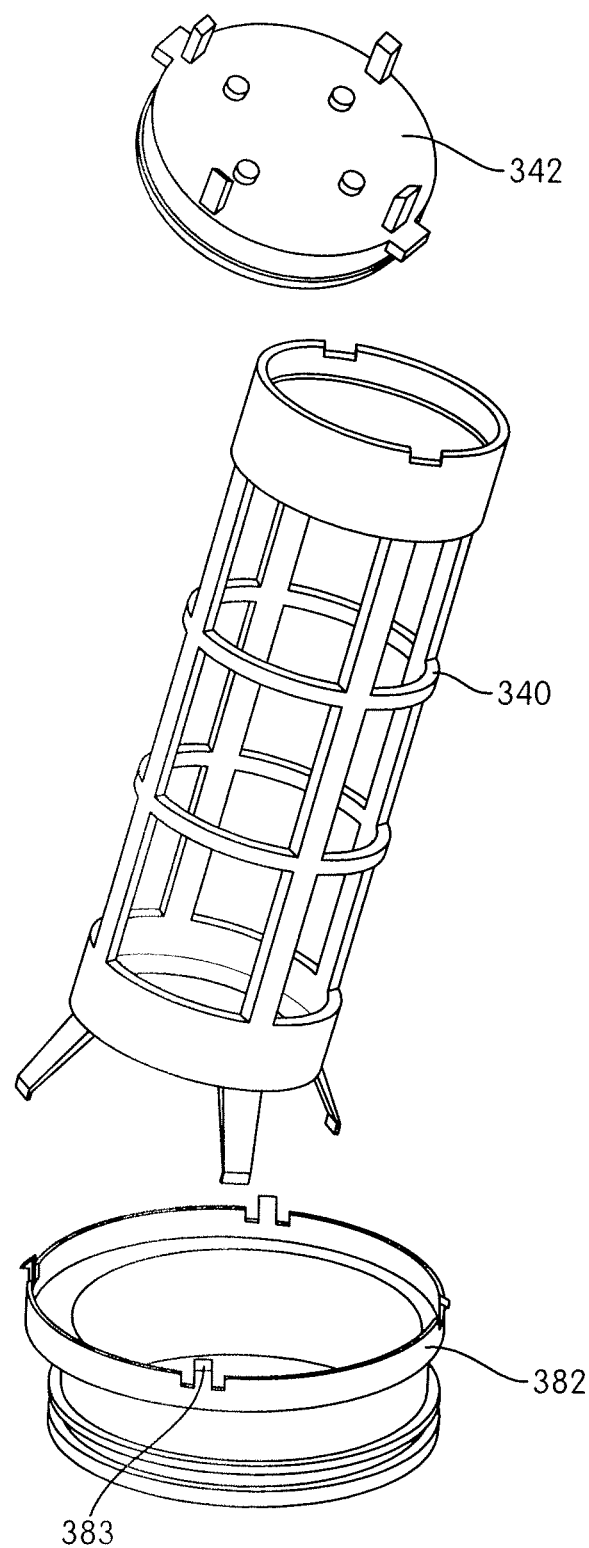
FIG. 15 is an exploded perspective view of the inner filter of the embodiment of FIG. 11.
Figure 16:
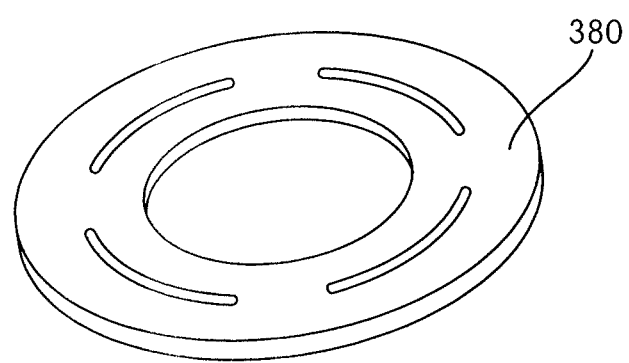
FIG. 16 is a perspective view of an endplate of the embodiment of FIG. 11.

The top cover 342 of the inner filter element 3632 may include a variety of protrusions configured to locate the top cover 342 with respect to the first endplate 378. As shown in FIG. 15, the top cover 342 may include tabs configured to engage the frame structure 340, and projections configured to locate the top cover 342 with respect to the first endplate 378. The top cover 342 may include a channel configured to accept the frame structure 340, or may include a projection extending in the direction of the central cavity of the filter configured to contact the inner surface of the frame structure. The manner in which the top cover 342 engages the frame structure 340 prevents fluid from flowing between the frame structure 340 and the top cover 342.

The first endplate 378 and second endplate 380 may be produced from relatively inexpensive materials, such as metal or plastisol, on existing production equipment, while the inner filter 162 may be formed from materials, such as plastic or epoxy, and by methods that facilitate the formation of effective seals. In this way, the cost of producing the filter may be reduced. Additionally, the snap-lock features of the inner filter 362 and the outer filter 360 allow for a simplified filter assembly process that does not require additional gaskets or glue, and prevents the disengagement of the inner filter 362 from the outer filter 360.

The terminology used herein is intended to describe particular embodiments and is not intended to be limiting. The terms "a," "an," and "the" include the plural forms as well, unless clearly indicated otherwise. The terms "comprises" and/or "comprising," when used herein, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used herein may, but does not necessarily, refer to the same embodiment. The embodiments described herein are exemplary only. Other and further embodiments may be devised without departing from the basic scope thereof, with the true scope and spirit of the disclosure being indicated by the claims that follow.

What is claimed:

1. A fuel water separator filter, comprising:
   an outer filter with a bottom endplate; and
   an inner filter at least partially disposed within and secured to the outer filter, the outer filter and the inner filter combined providing a plurality of water separating layers,
   wherein the inner filter comprises:
      a first sealing region positioned on an exterior of the inner filter, the exterior of the inner filter disposed at least partially outside of the outer filter, the first sealing region of the inner filter configured to produce a seal with a surface of a filter housing,
      a second sealing region configured to contact a sealing surface of a standpipe structure to produce a seal between the inner filter and the standpipe structure, and
      a third sealing region configured to produce a seal between the inner filter and the bottom endplate of the outer filter.

2. The fuel water separator filter of claim 1, wherein the inner filter further comprises a snap-lock attachment configured to engage the outer filter.

3. The fuel water separator filter of claim 1, wherein the inner filter further comprises an anti-backoff portion configured to engage the outer filter and prevent the inner filter from disengaging the outer filter.

4. The fuel water separator filter of claim 1, wherein the inner filter further comprises openings configured to allow water removed from a fuel flow through the fuel water separator filter to drain to a water sump of the filter housing.

5. A fuel water separator filter, comprising:
   an outer filter comprising filtration media; and
   an inner filter at least partially disposed within and secured to the outer filter, the outer filter and the inner filter combined providing a plurality of water separating layers,
   wherein the inner filter includes an endplate configured to seal an end of the filtration media of the outer filter.

6. The fuel water separator filter of claim 5, wherein the inner filter is formed integrally as a single unitary structure with the endplate.

7. The fuel water separator filter of claim 5, wherein the inner filter further comprises:
   a first sealing region configured to produce a seal between the inner filter and a standpipe structure of a filter housing; and a second sealing region configured to produce a seal between the inner filter and the filter housing.

8. The fuel water separator filter of claim 5, wherein the inner filter further comprises openings configured to allow water removed from a fuel flow through the fuel water separator filter to drain to a water sump of a filter housing.

9. The fuel water separator filter of claim 1, wherein the bottom endplate of the outer filter comprises a neck extending axially away from a rim of an opening defined in the bottom endplate into an outer filter central opening defined by the outer filter.

10. The fuel water separator filter of claim 9, wherein the inner filter comprises a frame structure extending into the outer filter central opening, a radially inward surface of the frame structure defining a central opening that is configured to accept the standpipe structure of the filter housing.

11. The fuel water separator filter of claim 10, wherein a plurality of openings are defined in the frame structure so as to allow water separated by the inner filter from a fuel flow through the fuel water separator filter to flow through the central opening of the frame structure, along the radially inward surface of the frame structure and to exit the fuel water separator filter.

12. The fuel water separator filter of claim 10, wherein the frame structure further comprises a collar extending in a direction orthogonal to a longitudinal axis of the frame structure and having a diameter that exceeds a diameter of the opening defined in the bottom endplate.

13. The fuel water separator filter of claim 12, wherein the frame structure further comprises a plurality of sealing projections extending radially in a direction orthogonal to the longitudinal axis, the plurality of sealing projections formed in a portion of the frame structure that is located within the neck of the bottom endplate.

14. The fuel water separator filter of claim 13, wherein each one of the plurality of sealing projections is a first plurality of sealing projections that extends a length from the frame structure that is less than a length of a second plurality of sealing projections that is located more proximate to the collar.

15. The fuel water separator filter of claim 5, wherein the inner filter comprises a frame structure extending into an outer filter central opening defined by the outer filter, a radially inward surface of the frame structure defining a central opening that is configured to accept a standpipe structure of a filter housing.

16. The fuel water separator filter of claim 15, wherein a sealing region is formed on a portion of the frame structure that extends beyond the endplate of the inner filter a direction away from the outer filter central opening.

17. The fuel water separator filter of claim 5, further comprising a coalescing layer secured to an interior side of the outer filter and extending to the endplate of the inner filter.

* * * * *